Jan. 6, 1925.
F. W. EICHER
1,521,934
AUXILIARY AXLE STUB SHAFT
Filed July 2, 1920     2 Sheets-Sheet 2
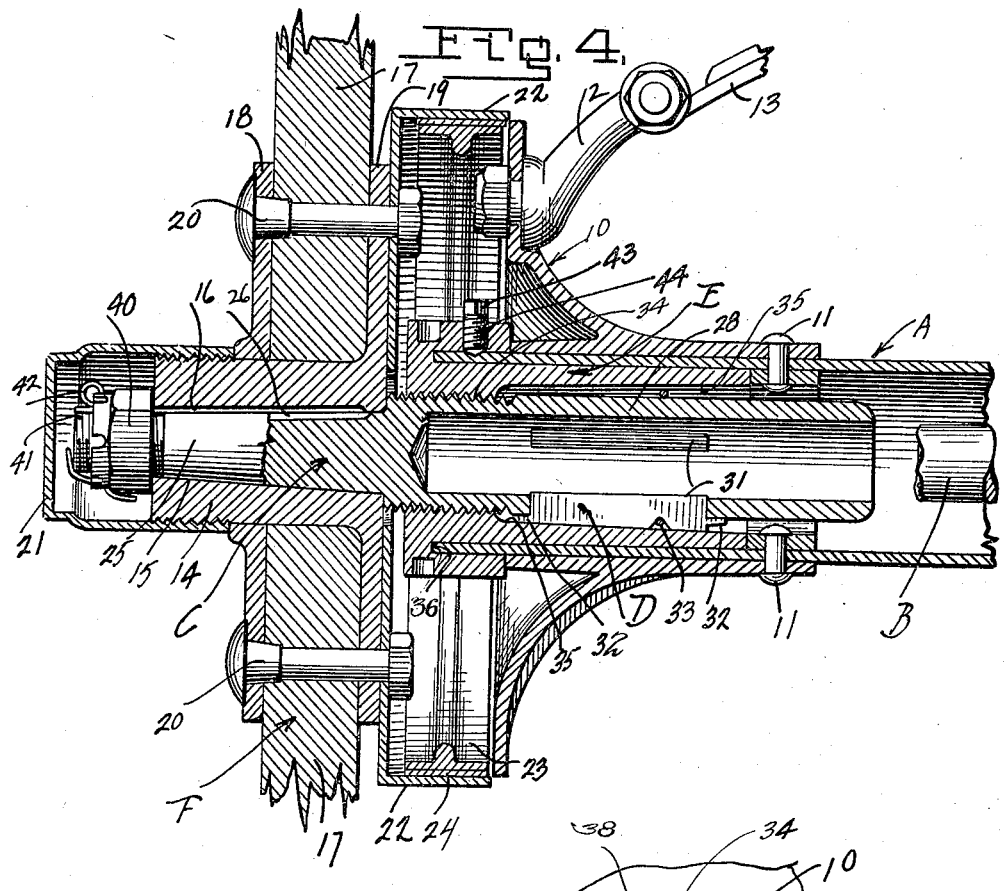
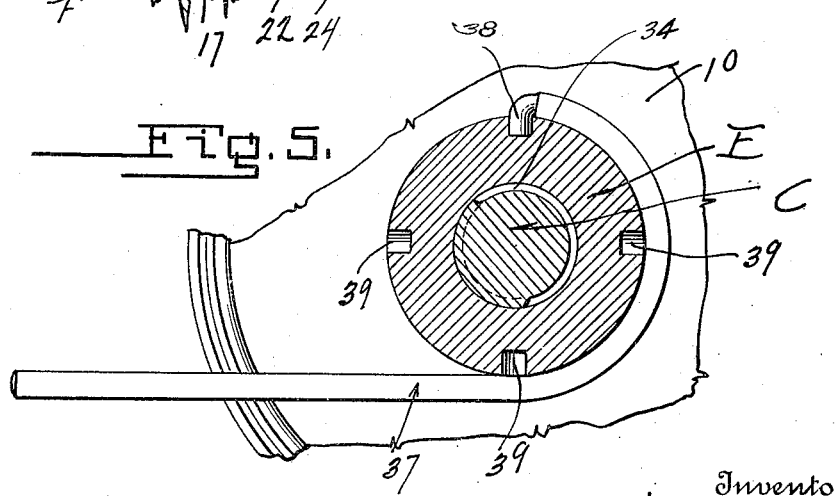
Inventor
F. W. Eicher
By Lancaster and Allwine
Attorneys Patented Jan. 6, 1925.

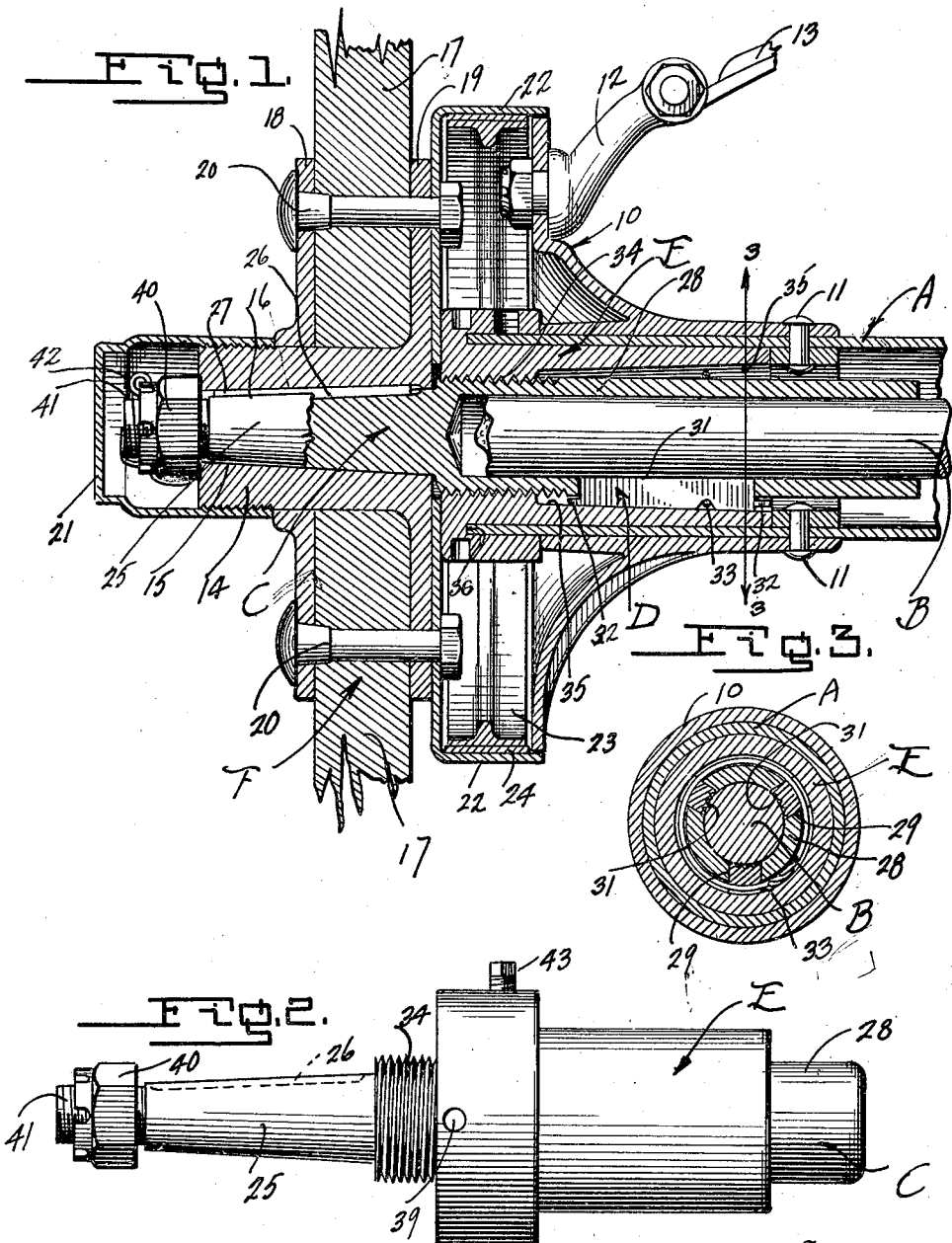

1,521,934

UNITED STATES PATENT OFFICE.

FOSTON W. EICHER, OF PORTAGE, PENNSYLVANIA.

AUXILIARY AXLE STUB SHAFT.

Application filed July 2, 1920. Serial No. 393,517.

*To all whom it may concern:*

Be it known that I, FOSTON W. EICHER, a citizen of the United States, residing at Portage, in the county of Cambria and State of Pennsylvania, have invented certain new and useful Improvements in Auxiliary Axle Stub Shafts, of which the following is a specification.

This invention relates to an auxiliary axle stub shaft for use in connection with broken axle shafts.

An important object of the invention is the provision of an auxiliary axle stub shaft for use on vehicles or the like which can be used to repair the broken end of an axle assembly in such manner that the vehicle can be employed for its ordinary purpose.

A further object of the invention is the provision of the device of the above described character which can be used as an attachment upon a motor vehicle having a broken axle, in such a manner as to permit easy towing of the vehicle to desired point.

A further object of the invention is the provision of a device of the above described character which is simple in construction, efficient in use, and occupying such little space as to be capable of being easily carried upon a motor vehicle as an accessory.

A further object of the invention is the provision of a device of the above described character which can be locked to a broken axle drive shaft in such manner as to allow ordinary operation of a car.

Other objects and advantages will be apparent during the course of the following detailed description.

In the accompanying drawings forming a part of this specification and in which like reference characters designate like parts throughout the same, Figure 1 is a fragmentary cross-sectional view of a rear axle assembly showing the auxiliary axle stub shaft attached to the broken end of an axle shaft.

Fig. 2 is a side elevation of the auxiliary axle stub shaft.

Fig. 3 is a cross-sectional view taken on the line 3—3 of Fig. 1.

Fig. 4 is a fragmentary cross-sectional view of a rear axle assembly showing the auxiliary axle stub shaft rigidly locked to the axle housing.

Fig. 5 is a cross-sectional view of a part of the auxiliary axle stub shaft, showing the means used for applying the axle to the rear axle assembly.

In the drawings wherein for the purpose of illustration is shown a preferred embodiment of my invention, the letter A designates a vehicle rear axle housing, having a broken axle drive shaft B mounted therein. An auxiliary stub axle C is securely locked to the broken drive axle B, keys D being forced into locking engagement with shaft B by sleeve E mounted upon the stub axle C. A wheel structure F of the vehicle is shown attached to the stub axle C.

In the type of rear axle assembly shown in the drawings, rear axle brake housing 10 is preferably mounted upon the axle housing A and secured thereto as by rivets 11. A spring hanger or perch 12 is shown as secured to the brake housing 10 for supporting a spring 13 of an automobile (not shown).

The wheel structure is of any conventional type and may comprise a hub 14, having a tapered aperture 15 therein and a key way 16. The spokes 17 are preferably secured in place upon hub 14 and between hub flanges 18 and 19 as by bolts 20. A dust cap 21 of any approved type is detachably mounted upon the hub 14. A brake drum 22 is likewise secured to the wheel structure F, by bolts 20, which contains a brake shoe 23 and brake lining 24.

The auxiliary axle stub shaft C comprises a spindle portion 25 tapered outwardly and similar in construction to the spindle of an ordinary axle. A key way 26 is formed upon the spindle portion 25 and adapted to receive a key 27 for locking the axle stub shaft C to the hub 14 of the wheel structure F. An enlarged hollowed portion 28 is preferably formed integral with the spindle portion 25, and adapted to receive the broken end of an axle drive shaft. Slots 29 are preferably provided in the hollowed portions 28 for the loose reception of locking keys D. The keys D are preferably serrated upon their faces 31 which project inwardly into the hollowed portion 28, and are held in place in their respective slots by projections 32 formed upon their ends, and a wire band 33 embracing the exterior of the hollowed portion 28. Locking sleeve E is detachably mounted upon the enlarged hollowed portion 28 as by screw threads 34, and is provided with an interior tapered bore 35 tapering from the screw threads and adapted for engaging the exterior faces of the keys D, for forcing said keys inwardly into their slots, upon rotation of the sleeve E upon the axle stub shaft. A recess 36 is provided upon the sleeve E adapted to receive the axle housing of the rear axle assembly. A spanner wrench 37 is provided, having a head 38 thereon adapted for projecting into apertures 39 within the locking sleeve E for facilitating tightening of the sleeve E upon the axle stub C.

It has been found in the type of rear axle assembly such as is shown in the drawings, that the drive axle sometimes breaks off adjacent the brake drum of the wheel structure. A new axle is then generally required before the vehicle to which the axle is applied can be driven or even towed. In case the drive axle should break as above described and result in the broken end B, as is shown in Figure 1, the application and opperation of this invention is as follows. The wheel F having been removed the axle stub shaft C together with the keys D and sleeve E are placed upon the axle housing in such manner that the broken end B of the drive axle projects into the hollowed portion 28. The locking sleeve E is then rotated upon the screw threads 34 by the spanner wrench 37 until the tapered bore 35 contacting with the keys D force their corrugated faces 31 to bite into the drive axle B, thus securely locking the axle stub shaft C and the drive axle B together. The wheel structure is then keyed upon the spindle 25 and a castle nut 40 applied to a screw threaded end 41 of the spindle 25 for securely locking the wheel upon said spindle. Cotter pin 42 and dust cap 21 are then applied and the rear drive axle can be used in its ordinary manner for an indefinite period, since a lubricant can be supplied by a grease cup or similar device (not shown) which can be mounted upon the brake housing and communicate with the bearing surfaces.

Should the drive axle B break off too far from the brake housing 10 as to permit accommodation within the hollowed portion 28 of the auxiliary axle stub C, the application of the device is similar in all respects to the above mentioned procedure. However instead of locking keys D sliding into the broken end B of the drive axle the sleeve E is tightened upon the stub axle C until it is securely locked thereto by means of a tapered bore contacting with the exterior face of keys D and securely locking them together. Since the axle housing is within the recess 36 of the sleeve E, it is necessary to securely lock them together to prevent relative movement and this is accomplished by a set screw or set screws 43 placed within the screw threaded aperture 44 of the sleeve E in abutting relation against a portion of the axle housing which projects into an annular pocket in the sleeve E. However in utilizing the auxiliary axle stub shaft in this manner the key 27 cannot be used upon the spindle and the vehicle cannot proceed under its own power, it being necessary to tow the machine, since the stub axle is securely locked to the axle housing and the wheel structure F so placed upon the spindle 25. It is to be understood that the form of my invention herewith shown and described is to be taken as the preferred example of the same and that various changes in the shape, size and arrangement of parts may be resorted to without departing from the spirit of the invention or the scope of the subjoined claims.

I claim:

1. In a structure of the character described, a hollow body having one end portion threaded and having longitudinally extending slots intermediate its length, keys extending into the body through the slots and movable radially of the body, means carried by said keys for engaging the outer face of the body and limiting inward movement of the keys, a sleeve fitting about said body and having one end portion internally threaded and engaging the threaded end portion of the body, the sleeve for the remainder of its length having its inner surface outwardly flared to provide a cam surface for engaging said keys and moving the keys inwardly as the sleeve moves longitudinally upon the body in one direction.

2. In a structure of the character described, a cylindrical body having a shaft receiving pocket provided with annular walls having longitudinally extending slots, keys fitting into the slots for movement radially of said body and having lug extensions for engaging the outer face of the body and limiting inward movement of the keys, and a sleeve fitting about the body and adjustable longitudinally thereon and having its inner surface tapered to provide a cam surface for engaging the keys and moving the keys inwardly.

FOSTON W. EICHER.